United States Patent [19]

Tricoles et al.

[11] 4,422,076

[45] Dec. 20, 1983

[54] PASSIVE SYNTHETIC APERTURE SYSTEM FOR LOCATING A SOURCE OF ELECTROMAGNETIC RADIATION

[75] Inventors: Gus P. Tricoles, San Diego; Eugene L. Rope, El Cajon, both of Calif.

[73] Assignee: General Dynamics Corporation, Electronics Division, San Diego, Calif.

[21] Appl. No.: 171,979

[22] Filed: Jul. 24, 1980

[51] Int. Cl.³ .......................... G01S 3/02; G01S 5/02
[52] U.S. Cl. .................................. 343/458; 343/457; 343/419; 367/12
[58] Field of Search ........... 343/5 CM, 113 R, 112 D; 367/12

[56] References Cited

U.S. PATENT DOCUMENTS

| | | | |
|---|---|---|---|
| 2,921,306 | 1/1960 | Jaffe | 343/112 |
| 3,378,842 | 4/1968 | Phillips | 343/112 D |
| 3,789,410 | 1/1974 | Smith et al. | 343/112 D |
| 3,935,574 | 1/1976 | Pentheroudakis | 343/113 R |
| 3,971,027 | 7/1976 | Alcock et al. | 343/113 R |
| 3,975,734 | 8/1976 | Payne | 343/5 CM |
| 4,179,697 | 12/1979 | Golinsky | 343/112 D |
| 4,244,036 | 1/1981 | Raven | 367/12 |

FOREIGN PATENT DOCUMENTS 1454368 11/1976 United Kingdom ............ 343/5 CM

*Primary Examiner*—S. C. Buczinski
*Attorney, Agent, or Firm*—Brown & Martin

[57] ABSTRACT

A vehicle-mounted passive synthetic aperture system for locating a source of electromagnetic radiation having a given wavelength $\lambda$. The system includes first and second receiving antennas, a phase sensitive receiver and a signal processor. The first and second antennas are mounted to a vehicle and spaced apart from each other in the principle direction of motion associated with the vehicle. The first and second antennas respectively provide first and second received signals in response to electromagnetic radiation having the given wavelength $\lambda$. The phase sensitive receiver is coupled to the first and second antennas and responds to the first and second received signals by providing a phase difference signal that indicates a phase difference that is proportional to the difference between the respective ranges from the first and second antennas to the source of the received radiation when the received radiation is radiated spherically from its source. The signal processor is coupled to the receiver for processing the phase difference signal in combination with the measured speed of the vehicle to determine the range and direction from the vehicle to the source of the electromagnetic radiation. The system of the present invention effectively uses the motion of the vehicle to synthesize an aperture. The synthesized aperture is long relative to the spacing between the receiving antennas (which spacing is limited by vehicle size) so that angular resolution is greater than that of a fixed antenna system with a baseline length equal to the spacing between the receiving antennas of the present system.

2 Claims, 7 Drawing Figures

PASSIVE SYNTHETIC APERTURE SYSTEM FOR LOCATING A SOURCE OF ELECTROMAGNETIC RADIATION

BACKGROUND OF THE INVENTION

The present invention generally pertains to electromagnetic communications and is particularly directed to an improved system mounted on a vehicle for locating sources of electromagnetic radiation.

Prior art systems mounted on a vehicle for locating sources of electromagnetic radiation include an array of antennas and receivers forming an interferometer, with the baseline length being limited to the physical dimensions of the vehicle. Resolution of the radiating sources by these prior art systems is limited by the baseline length.

SUMMARY OF THE INVENTION

The present invention provides a passive synthetic aperture system for locating a source of electromagnetic radiation having a given wavelength $\lambda$. The system basically includes first and second receiving antennas, a phase sensitive receiver and signal processor. The receiver can be tuned to receive multi-frequency radiation.

The first and second antennas are mounted to a vehicle and spaced apart from each other by a predetermined distance in the principle direction of motion associated with the vehicle. The first and second antennas respectively provide first and second received signals in response to electromagnetic radiation having the given wavelength $\lambda$.

The phase sensitive receiver is coupled to the first and second antennas and responds to the first and second signals by providing a phase difference signal that indicates a phase difference $\phi_{21}$ that is proportional to the difference between the respective ranges from the first and second antennas to the source of the received radiation when the received radiation is radiated spherically from its source.

The speed of the vehicle is measured.

The signal processor is coupled to the receiver for processing the phase difference signal in combination with the measured speed of the vehicle to determine the range and direction from the vehicle to the source of the electromagnetic radiation.

The system of the present invention effectively uses the motion of the vehicle to synthesize an aperture. The synthesized aperture is long relative to the spacing between the receiving antennas (which spacing is limited by vehicle size) so that angular resolution is greater than that of a fixed antenna system with a baseline length equal to the spacing between the receiving antennas of the present system.

The theory and operation of the invention and various additional features thereof are discussed in relation to the description of the preferred embodiment.

DESCRIPTION OF THE PREFERRED EMBODIMENT

Figure 1:
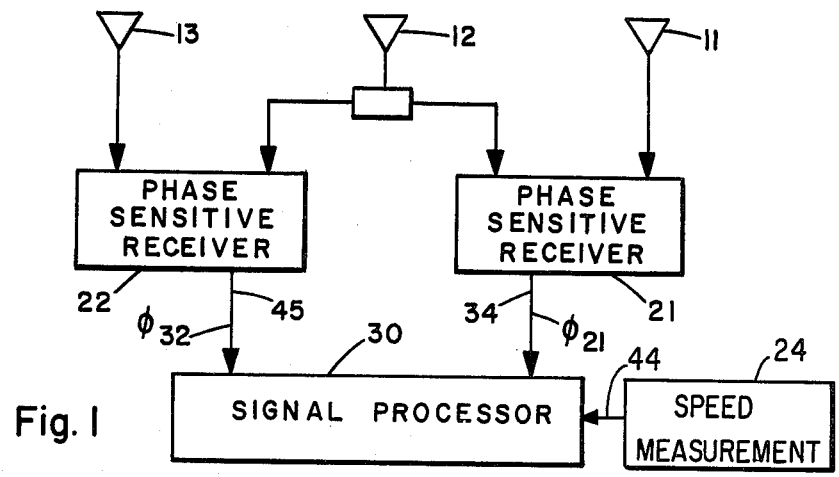
FIG. 1 is a schematic block diagram of the system of the present invention.
Figure 2:
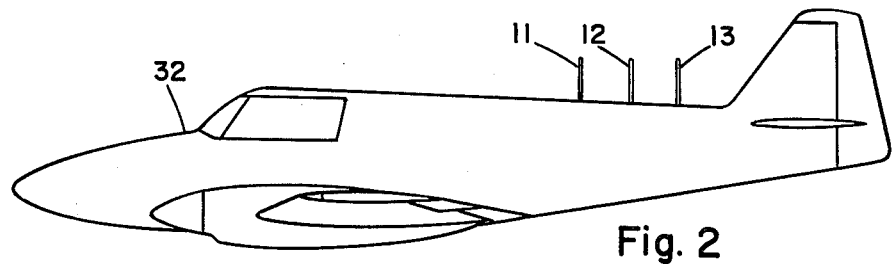
FIG. 2 schematically illustrates the receiving antennas of the system of FIG. 1 mounted on an airplane.

Referring to FIG. 1, the preferred embodiment of the system of the present invention includes a first receiving antenna 11, a second receiving antenna 12, a third receiving antenna 13, a first phase sensitive receiver 21, a second phase sensitive receiver 22, a speed measurement system 24 and a signal processor 30. The system is carried by a vehicle such as an airplane 32 (shown in FIG. 2), helicopter, missile, ship, train, truck, automobile or van.

The first, second and third receiving antennas 11, 12, 13 are mounted on the top of the fuselage of the airplane 32 and are spaced apart from each other by a distance "2d" along a center line running in the principle direction of motion associated with the airplane 32. The antennas 11, 12, 13 are monopole antennas. Alternatively, the antennas 11, 12, 13 may be dipole antennas having their receiving elements aligned with the principle direction of motion of the airplane.

The first, second and third receiving antennas 11, 12, 13 respectively provide received signals in response to electromagnetic radiation having the given wavelength $\lambda$ received by the first, second and third antennas.

Figure 3:
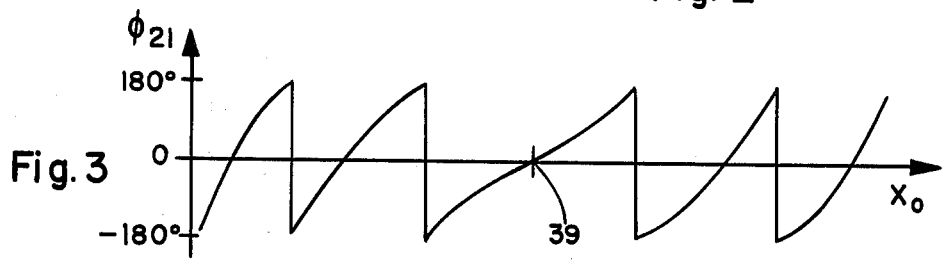
FIG. 3 illustrates the phase difference signal provided from a phase sensitive receiver in the system of FIG. 1 in relation to the displacement of the system when moving past a source of electromagnetic radiation.

The first phase sensitive receiver 21 is coupled to the first receiving antenna 11 and the second receiving antenna 12, and provides a first phase difference signal on a line 34 to the signal processor 30 in response to the first and second received signals provided by the first and second antennas 11, 12. The first phase difference signal on the line 34 (as shown in FIG. 3) indicates the phase difference $\phi_{21}$ between the wavefronts of the radiation of the given wavelength $\lambda$ received by the first and second antennas 11, 12. The phase difference $\phi_{21}$ indicated by the first phase difference signal on the line 34 is proportional to the difference between the respective ranges $r_1$ and $r_2$ (FIG. 4), from the first and second antennas 11, 12 to the source 36 of the received radiation (FIG. 4) when the received radiation is radiated spherically from the source 36. The rate of change of phase difference $\phi_{21}$ with respect to displacement $X_o$ is greatly exaggerated in FIG. 3.

Figure 5:
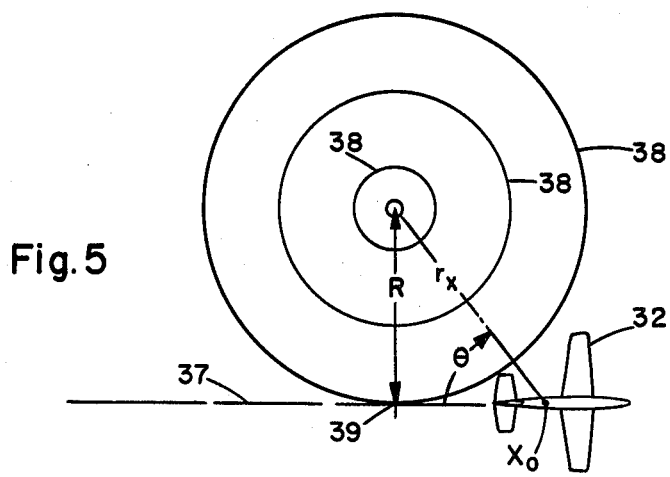
FIG. 5 illustrates the relationship of the flight path of the airplane to the wavefronts of the electromagnetic radiation emitted from the source.

Referring to FIG. 5, it is seen that when the airplane 32 files in a straight path past a spherically radiating source 36, the flight path 37 of the plane 32 is tangential to one of the wavefronts 38 at a tangential point 39 that is a distance R from the source 36 when the airplane 32 is closed to the source 36. As the airplane 32 moves along the path 37, it is displaced by a distance $X_o$ from the tangential point 39.

Figure 4:
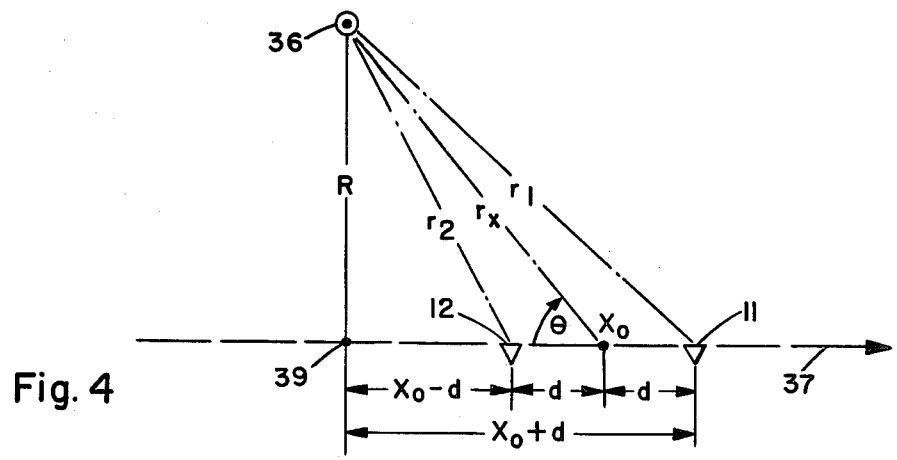
FIG. 4 is a diagram showing the spatial relationship of the receiving antennas of the system of FIG. 1 to the electromagnetic radiation source and the flight path.

Referring now to FIG. 4, the first and second receiving antennas 11, 12 are shown as they move along the flight path 37. A point $X_o$ midway between the antennas 11 and 12 represents the displacement of the airplane 32 from the tangential point 39. It is seen that the range from the first antenna 11 to the source 36 is $r_1$, and antenna 12 to the source 36 is $r_2$.

Figure 6:
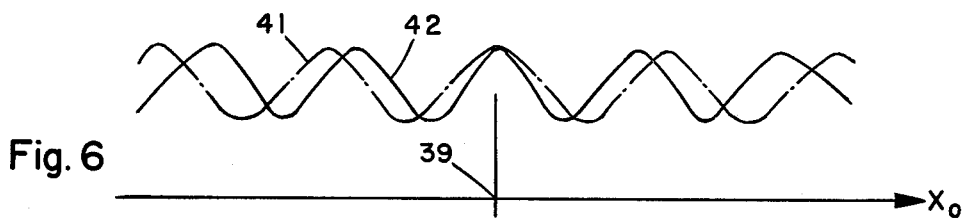
FIG. 6 illustrates the instantaneous relative intensity waveforms of the electromagnetic radiation received by adjacent receiving antennas of the system of FIG. 1 in relation to the displacement of the system when moving past the source of electromagnetic radiation.

FIG. 6 illustrates the instantaneous relative intensity waveforms 41 and 42 of the radiation of the wavelength $\lambda$ respectively received by the first and second antennas 11, 12 as their midpoint $X_o$ moves along the flight path 37 past the source 36. The changes during consecutive cycles is greatly exaggerated in FIG. 6. The scale for displacement $X_o$ in FIG. 6 is not the same as the scale for displacement $X_o$ in FIG. 3. It is seen that as the midpoint $X_o$ approaches the tangential point 39, the waveform 41 received by the first antenna 11 lags the waveform 42 received by the second antenna 12, and that as the midpoint $X_o$ moves away from the tangential point 39, the wave form 41 received by the first antenna 11 leads the waveform 42 received by the second antenna 12. At the tangential point 39, the waveforms 41 and 42 are in phase with each other. The phase difference between the waveforms 41 and 42 corresponds to the phase difference $\phi_{21}$ indicated by the first phase difference signal on line 34 illustrated in FIG. 4.

The phase difference $\phi_{21}$ is proportional to the difference between the respective ranges $r_1$ and $r_2$ from the first and second antennas 11 and 12 to the radiation source 36 and may be expressed with relation to the distances shown in FIG. 4 as follows:

$$\phi_{21} = K(r_2 - r_1), \quad (1)$$

wherein K equals $2\pi/\lambda$.

$$\phi_{21} = K\{[R^2 + (X_o + d)^2]^{\frac{1}{2}} + [R^2 + (X_o - d)^2]^{\frac{1}{2}}\}. \quad (2)$$

After expanding the square rods by binomial expansion, the phase difference to the second order is:

$$\phi_{21} = K\left\{\left[R + \frac{(X_o + d)^2}{2R}\right] - \left[R + \frac{(x_o - d)^2}{2R}\right]\right\}, \text{ or} \quad (3)$$

$$\phi_{21} \cong K(2d)R^{-1}X_o \quad (4)$$

Figure 7:
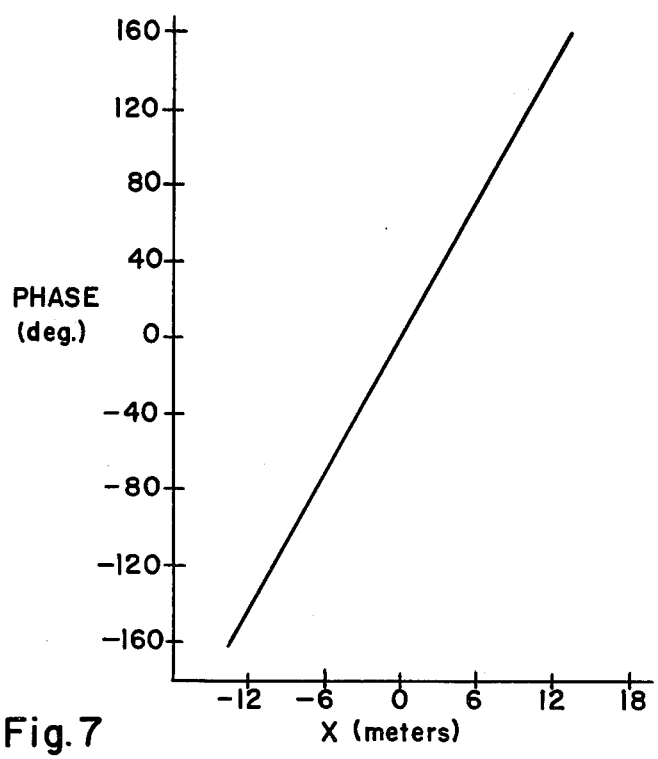
FIG. 7 is a curve of measured data showing the relationship between the phase difference between the intensity peaks in the waveform of FIG. 3 in relation to the displacement of the system when moving past the source of electromagnetic radiation.

Thus the phase difference $\phi_{21}$ is a linear function of the displacement distance $X_o$ from the tangential point 39 where the range from the airplane 32 to the radiation source 36 is the distance R. This linear relationship has been experimentally verified with a pair of receiving antennas mounted on the top of an automobile. The results are shown in FIG. 7. The frequency of the emitted radiation was 900 MHZ, where $\lambda$ equaled 33.3 cm. The predetermined distance "2d" between the antennas was 66.7 cm. The range R was 100 meters. The displacement $X_o$ is plotted from the tangential point where the displacement equals zero. The phase difference $\phi_{21}$ is plotted in degrees.

Referring again to FIG. 3, it is seen that the phase difference $\phi_{21}$ diminishes to zero as the midpoint $X_o$ approaches the tangential point 39 and then increases as the midpoint $X_o$ moves away from the point 39 along the path 37. In the waveform of FIG. 3, as displacement from the tangential point 39 increases, the phase difference $\phi_{21}$ indicated in each successive cycle is 360 degrees greater than in the preceding cycle.

The signal processor 30 processes the first received signal on line 34 to determine the range from the airplane 32 to the radiation source 36. The displacement $X_o$ can be measured continuously in accordance with the measured speed of the airplane 32. An indication of the measured speed of the airplane 32 is provided by the speed measurement system 24 on line 44 to the signal processor 30. Because Equation 4 defines a linear relationship, the range R from the tangential point 39 to the radiation source 36 can readily be determined by extrapolation as the airplane 32 approaches and/or moves away from the tangential point 39 where the phase difference $\phi_{21}$ equals zero. Once the range R is determined and with the displacement $X_o$ being continuously measured, the signal processor 30 can readily determine the range $r_x$ (see FIG. 4) from the airplane 32 to the source 36 in accordance with the Pythagorean Theorem; and can determine the angle $\theta$ that indicates the direction to the source 36 by simple trigonometry. Alternatively, the processor 30 Fourier transforms the integrated values of $\phi_{21}$ to form images of the radiation sources.

The system utilizes the third receiving antenna 13 and the second phase sensitive receiver 22 to provide a check for any yaw of the airplane 32. Referring again to FIG. 1, the second phase sensitive receiver 22 is coupled to the second receiving antenna 12 and the third receiving antenna 13, and provides a second phase difference signal on a line 45 to the signal processor 30 in response to the second and third received signals provided by the second and third antennas 12, 13. The second phase difference signal on the line 45 indicates the phase difference $\phi_{32}$ between the wavefronts of the radiation of the given wavelength received by the second and third antennas 12, 13. The phase difference $\phi_{32}$ indicated by the second phase difference signal on the line 45 is proportional to the difference between the respective ranges from the second and third antennas 12, 13 to the source of the received radiation when the radiation is radiated spherically from the source.

The signal processor 30 compares the phase difference $\phi_{21}$ indicated by the first phase difference signal on line 34 at a time $t_o$ when the first and second antennas 11, 12 occupy a given absolute position in space, to the phase difference $\phi_{32}$ indicated by the second phase difference signal on the line 45 at the time $t_o + \Delta t$ that the second and third antennas 12, 13 would occupy the same position in space if the motion of the airplane 32 were in a straight line. Thus, if the flight path 37 is a straight line and the radiation source 36 is stationary, $$\phi_{21}(t_o) = \phi_{32}(t_o + \Delta t). \quad (5)$$

Any deviation from equality of $\phi_{21}(t_o)$ and $\phi_{32}(t_o + \Delta t)$ is an indication that the airplane is turning, and a correction is made to the measured data by the signal processor 30 to compensate for the yaw of the airplane.

It is assumed that the interval $\Delta t$ between the measurements of $\phi_{21}$ and $\phi_{32}$ is sufficiently small that phase changes caused by translation toward the source are not significant. This assumption is reasonable because the incident wavefront arrives from directions that are approximately orthogonal to the flight path 37; provided that the angle $\theta$ is not less than approximately 45 degrees.

The system of the present invention is passive. It does not radiate.

The system of the present invention does not require a local oscillator to provide a reference signal. The system is self-referencing. The reference is derived from the source of the received radiation of the given wavelength $\lambda$. Therefore, any atmospheric and multipath effects on the received signals are present in the radiation fields received by all of the receiving antennas. Any reference signal provided by a local oscillator on board the vehicle would not contain any atmospheric effects.

The system of the present invention is coherent for each separate source of radiation of the given wavelength $\lambda$; but distinct non-coherent sources of such radiation can be non-coherently processes. Thus speckle noise or coherent breaking would be reduced.

We claim:

1. A vehicle-mounted system for locating a source of electromagnetic radiation having a given wavelength, comprising first and second receiving antennas mounted to a vehicle and spaced apart from each other by a predetermined distance in the principle direction of motion associated with said vehicle for respectively providing first and second received signals in response to electromagnetic radiation having said given wavelength received by the first and second antennas;

a first phase sensitive receiver coupled to the first and second antennas for responding to the first and second received signals by providing a first phase difference signal that indicates a phase difference $\phi_{21}$ that is proportional to the difference between the respective ranges from the first and second antennas to the source of said received radiation when said received radiation is radiated spherically from said source, whereby the value of the first phase difference signal varies as the vehicle moves in a straight line;

means operable when said vehicle is moving for determining the speed of said vehicle; and a signal processor coupled to the receiver for processing the values of the first phase difference signal provided as the vehicle moves in a straight line past its point of closest approach to said radiation source in combination with said determination of vehicle speed to determine the range and direction from said vehicle to said source.

2. A system according to claim 1, further comprising a third receiving antenna mounted to said vehicle and spaced apart from the second antenna by the predetermined distance in the principle direction of motion associated with said vehcle for providing a third received signal in response to electromagnetic radiation having said given wavelength received by the third antenna; and a second phase sensitive receiver coupled to the second and third antenna for responding to the second and third received signals by providing a second phase difference signal that indicates a phase difference $\phi_{32}$ that is proportional to the difference between respective ranges from the second and third antennas to the source of said received radiation when said received radiation is radiated spherically from said source, whereby the value of the second phase difference signal varies as the vehicle moves in a straight line; and wherein the signal processor is coupled to the first and second phase sensitive receivers for comparing the phase difference $\phi_{21}$ at a time when the first and second antennas occupy a given absolute position in space, to the phase difference $\phi_{32}$ at the time that the second and third antennas would occupy the same position if the motion of said vehicle were in a straight line, to provide an indication of vehicle yaw.

* * * * *